Figure 1A:
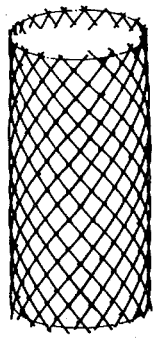
Figure 2A:
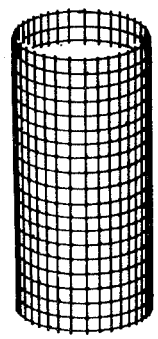

United States Patent
Yazawa et al.

[15] 3,635,633
[45] Jan. 18, 1972

[54] APPARATUS FOR BIAXIALLY STRETCHING A TUBULAR FILM

[72] Inventors: Masahide Yazawa; Setsuya Tsuyama, both of Tokyo, Japan

[73] Assignee: Polymer Processing Research Institute Ltd., Tokyo, Japan

[22] Filed: Oct. 8, 1970

[21] Appl. No.: 79,186

[30] Foreign Application Priority Data

Nov. 26, 1969 Japan................................44/94776

[52] U.S. Cl..............................425/302, 264/95, 425/324, 425/389
[51] Int. Cl. ....................................B29d 7/24, B29d 23/00
[58] Field of Search ....................18/14 R, 14 S, 14 V, 14 C, 18/14 G, 1 FB, 1 FM, 1 FZ, DIG. 17, DIG. 53; 264/95

[56] References Cited

UNITED STATES PATENTS

| | | | |
|---|---|---|---|
| 2,720,680 | 10/1955 | Gerow | 18/14 SX |
| 2,966,700 | 1/1961 | Dyer et al. | 18/14 SX |
| 2,987,765 | 6/1961 | Cichelli | 18/14 SX |
| 3,142,092 | 7/1964 | Ralston | 18/14 S |
| 3,246,061 | 4/1966 | Blatz | 18/14 SX |
| 3,426,113 | 2/1969 | Yazawa | 264/95 |

Primary Examiner—Robert L. Spicer, Jr.
Attorney—Fred C. Philpitt

[57] ABSTRACT

An apparatus for biaxially stretching a tubular film, by the use of a heated pressurized fluid supplied in the inside of the expanding tubular film and allowing to leak a part of the fluid through a thin layer clearance between the expanded tubular film and an inserted mandrel at the outside thereof and the difference of speeds between the feed side and takeup side, which is characterized by cylindrical nets of variable diameter, whose upper ends are fixed and on which a positive tension is applied vertically downwards, and which are provided at a leakage section of a heating pressurized fluid filling a thin layer clearance between the outer periphery of an umbrellalike insulating membrane and an expanded tubular film and at the discharge section of a cooling liquid along the outer periphery of an inserted bag mandrel and the expanded tubular film, respectively, to give a uniform and sufficient discharging resistance to the fluid at the entire outer periphery of the bag mandrel and thereby to reduce the leakage of the heating pressurized fluid, and to attain the facilitation of the pressure maintenance in the stretching section above the insulating membrane as well as the uniform discharge of the cooling liquid around the entire outer periphery of the bag mandrel.

4 Claims, 11 Drawing Figures

APPARATUS FOR BIAXIALLY STRETCHING A TUBULAR FILM

This invention relates to an apparatus for biaxially stretching a tubular film, and more particularly to an improvement in the apparatus for biaxially stretching a tubular film, by the use of a heated pressurized fluid supplied in the inside of the expanding tubular film, allowing the fluid to leak through a thin layer clearance between the expanded tubular film and an inserted mandrel at the outside thereof and the difference of speeds between the feed side and takeup side, which is characterized by cylindrical net articles of variable diameter, whose upper ends are fixed and on which a positive tension is applied vertically downwards, and which are provided at a leakage section of a heating pressure fluid filling a thin layer clearance between the outer periphery of an unbrellalike insulating membrane and an expanded tubular film and at the discharge section of a cooling liquid along the outer periphery of a bag mandrel, respectively, to give a uniform and sufficient discharging resistance to the fluid at the entire outer periphery of the bag mandrel and thereby to reduce the leakage of the heating pressurized fluid, and to attain the facilitation of the pressure maintenance as well as the uniform discharge of the cooling liquid around the entire outer periphery of the bag mandrel.

In the prior U.S. Pat. No. 3426113, the present inventor disclosed a method for biaxially stretching a tubular film, which comprises supplying a heating pressurized fluid to the inside of the tubular film in the course where the tubular film of thermoplastic polymer travels vertically downwards through the nip of pinch rollers at the feeding side inflating to stretch the tubular film toward the radial direction by said inside pressure, stretching the tubular film towards the longitudinal direction by a higher surface speed of pinch rollers at the taking-up side than the surface speed of pinch rollers at the taking-up side than the surface speed of the pinch rollers at the feeding side, inserting into the inside of the expanding tubular film, a bag mandrel, which is flexible and freely expandable toward the radial direction and is expanded by the inside pressure, in contact with the inside surface of the expanded tubular film to keep the stretching pressure while fixing the bag mandrel to a center pipe, allowing a cooling liquid supplied through the center pipe to the upper side of the bag mandrel to flow downwards, covering the upper side thereof with an umbrellalike insulating membrane whose upper end is also fixed to the center pipe to isolate the heating pressurized fluid at the upper side from the cooling liquid, allowing the lower end of the insulating membrane to open at the maximum diameter section of the expanded tubular film, and cooling and fixing the expanded tubular film by the cooling liquid flow downwards from said section.

However, since the apparatus of this prior patent utilizes a cloth for wrapping a bag mandrel inflated by an internal pressure, it has a drawback in that creased parts of the cloth formed before the inflation of the bag mandrel to a desired diameter cause leakage of fluid and make the maintenance of internal pressure difficult especially at the starting stage of the operation.

Accordingly, it is an object of the present invention to provide an improved apparatus wherein the above-mentioned drawback is overcome and efficient operation is ensured.

That is, the present invention is to provide an apparatus for biaxially stretching a tubular film, which comprises a pair of pinch rollers at the feeding side of the apparatus; a multiplex central shaft pipe, which supports a fluid distributor, an umbrellalike insulating membrane, a bag mandrel and a gastight block, a cutter and a pair of pinch rollers at the taking-up side; the multiplex central shaft pipe being provided with at least four passageways the first of which passageway has an outlet opening below the first pinch rollers but above the fluid distributor and is used for introducing a pressurized gas, the second of which passageway is connected to the fluid distributor and used for introducing a heating pressurized fluid, the third of which passageway has an opening below the umbrellalike insulating membrane but above the bag mandrel and is used for introducing cooling liquid and thermally insulated from the passageways for heating pressurized fluid, and the fourth of which passageway has a opening within the bag mandrel and is used for introducing a pressurized gas to inflate the mandrel; the fluid distributor having perforated sidewall of a sufficient vertical length to determine the starting level of stretching; the umbrellalike insulating membrane fixed to the central shaft pipe at an appropriate level below the fluid distributor fixed to the second passageway and having a sufficient length to cover the upper surface of the bag mandrel down to the maximum diameter section thereof; the bag mandrel, being flexible, whose upper end is fixed to the outer wall of the central shaft pipe at the level just below the opening of the third passageway and whose lower end is fixed to the gastight block fixed to the outermost sidewall of the multiplex shaft pipe; the cutter being located at a level sufficiently below the block; a pair of pinch rollers at the taking-up side at a level below the cutter, where a tubular film passes through between the nip of the first pinch rollers, and travels vertically downwards along the side surface of the fluid distributor and successively along the umbrellalike insulating membrane after being inflated and stretched, and is cut by the cutter and taken up by the second pinch rollers; characterized by a plurality of cylindrical net and a device which gives efficient tension to the net; the outermost net thereof being of fine mesh and placed upon the umbrellalike insulating membrane, whose upper end is fixed to the same wall of the central shaft pipe to which the umbrellalike insulating membrane is fixed, and the remaining cylindrical nets being of coarser meshes than the former and placed upon the bag mandrel and whose upper ends are fixed to the same wall of the central pipe to which the bag mandrel is fixed, the lower ends of all of those nets being fixed to the collar device which gives sufficient tensions to the net; the said device being placed around the outermost wall of the multiplex shaft pipe at a position sufficiently below the gastight block, capable of moving vertically along the pipe and exerting uniform and sufficient tensions on the nets, and an additional cylindrical net skirt being fixed, if necessary, to the cylindrical net at the maximum diameter section of the bag mandrel.

FIGS. 1a–1d show a case where the yarns constituting a cylindrical net used in the present invention are obliquely intersected and the meshes of said cylindrical net 1a are changed from mesh shapes of longer vertical distance and shorter horizontal distance to those of shorter vertical distance and longer horizontal distance through 1b–1c–1d with an expansion of the diameter of the cylindrical net.

FIGS. 2a–2d show a case where the warp and weft yarns are intersected at right angle and the meshes of the net 2a are changed through 2b–2c–2d towards less slackened weft yarns with an expansion of the diameter of the cylindrical net.

Figure 3A:
Figure 1B:
Figure 2B:
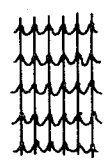
Figure 1C:
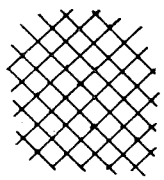
Figure 2C:
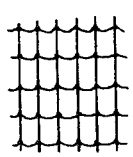
Figure 3B:
Figure 1D:
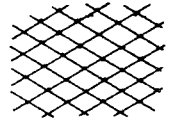
Figure 2D:
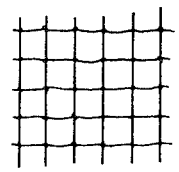

FIG. 3a shows an enlarged view of a twisted yarn constituting the net, and FIG. 3b shows a net yarn prepared by applying such a processing as rubbing a surface of the net yarn, which comes in contact with a film, with a sandpaper or the like to fluff the fibers at the convex outer portions of the twisted yarn and allowing the developed fluffs to fill the concave outer portion of the twisted yarn to reduce a fluid leakage from the contact surface between the film and the net yarn.

Figure 4:
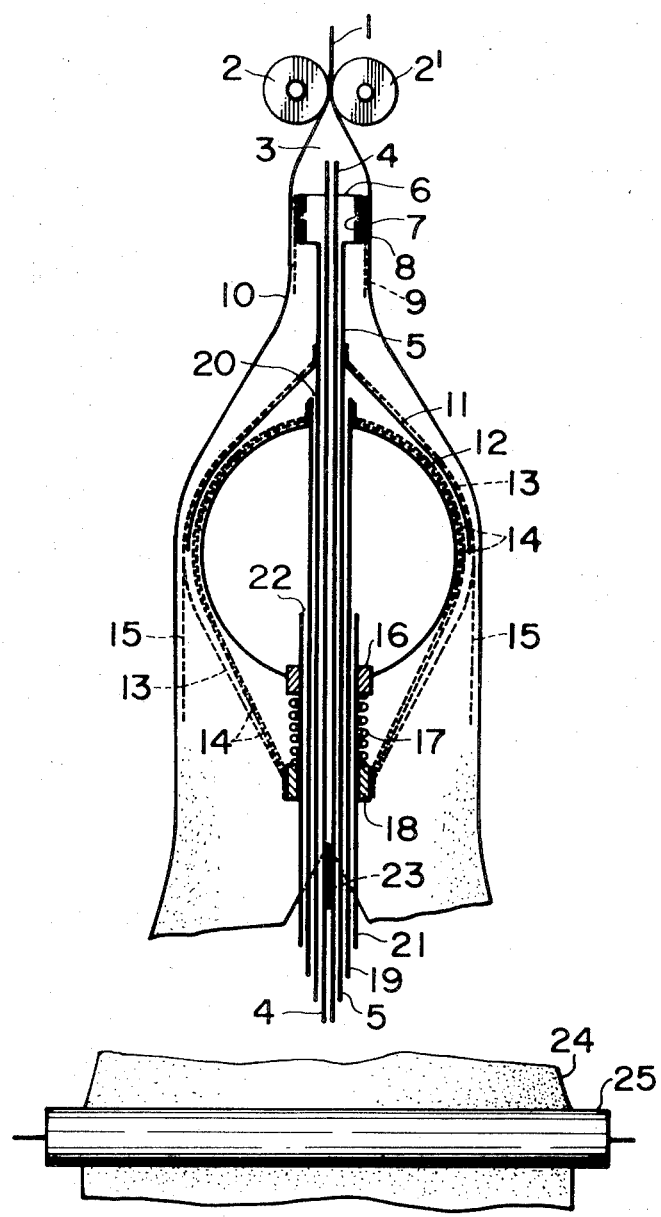

FIG. 4 shows a cross-sectional schematic view of the present apparatus fitted with the cylindrical net.

FIGS. 1a–1d and FIGS. 2a–2d illustrate the cylindrical net before it is fixed to the apparatus. The kind and mesh size of the net can be properly selected in view of its service purpose. For example, when it is used to prevent the leakage of the heating pressurized fluid as much as possible, as in the case where net is used to cover the outer periphery of the umbrellalike insulating membrane above the bag mandrel, a net of fine mesh size and fine yarn is used, and it is preferable to use a net of teflon (fluorine containing resin) yarns to improve the slidability of the tubular film. However, a net of other synthetic fiber yarns can be, of course, used without any trouble. When it is fixed to cover the outer periphery of the bag mandrel below the umbrellalike insulating membrane, a net of coarse mesh size is used to facilitate the discharge of the cooling water, or regular wavey rises or projections and indentations are endowed to the net yarns or several sheets of nets placed one upon another of a little small mesh size are used, whereby the cooling liquid is given a uniform discharge resistance at the outer periphery of the bag mandrel through the clearances formed between the overlappings of net meshes. Further, the cooling water is allowed to be discharged without applying any excessive pressure to the cooling liquid. If the required discharge pressure of the cooling liquid is excessive, the umbrellalike insulating membrane is pushed upwards and the opening level at the bottom end of the insulating membrane is moved upwards beyond the maximum diameter section of the bag mandrel. At that time, the tubular film in the course of expanding is improperly cooled by the cooling liquid, and its expansion and stretching is suspended and become insufficient and the tubular films slides over the bag mandrel and strongly presses the mandrel. These troubles are sometimes brought about thereby, unless the suitable combination of net is selected.

In the invention of U.S. Pat. No. 3,426,113, as above-mentioned, a fabric is used to encase the bag mandrel expanded by the inside pressure, but in case of a fabric, there are some creased and folded parts until the bag mandrel is expanded to the desired diameter. Much fluid is leaked from the creased parts and the maintenance of the inside pressure becomes difficult at this step. That is, such inconveniences are brought about in most of the cases.

In the present invention, a cylindrical net, whose upper and lower ends are collected and fixed so as to cover the bag mandrel and onto which a positive downward tension is applied, or the similar cylindrical net having the same effect is fixed to envelope the outer periphery of the bag mandrel of an elastomer expanded by the inside pressure, and thus according to a change in the diameter of the bag mandrel, the net undergoes to change its form from mesh shapes of longer vertical distance and shorter horizontal distance to those of shorter vertical distance and longer horizontal distance through $1b\rightarrow 1c \rightarrow 1d$, as shown in FIGS. $1a-1d$, with the expansion of the diameter of the bag mandrel without any folding of the net due to gathering of creases in the case where the cylindrical net is a net of obliquely intersected yarns. In the case where the cylindrical net is a net of warp and weft yarns intersected at a right angle, the saggings of the weft yarn are gradually improved through $2b\rightarrow 2c\rightarrow 2d$, as shown in FIGS. $2a-2d$. Accordingly, there occurs no folding as in the case where a fabric is used. When the horizontal diameter of the bag mandrel is small, the meshes are horizontally short and are horizontally expanded with the gradual increase in the diameter. At the lower half of the bag mandrel, the meshes become horizontally short according to a decrease in the horizontal diameter, and the net is gathered, while enveloping the outer periphery of the bag mandrel, for example, the net is fixed under tension by means of a coil spring, etc. Further, the meshes prevent the fluid from channelling. When the enveloping net is pressed onto the umbrellalike insulating membrane by a tension of the longitudinal direction of the expanded tubular film, the heating pressurized fluid for the expansion and stretching receives a great resistance in leaking through the meshes. Accordingly, a high stretching pressure can be readily maintained. For example, when the pressurized steam is used as a stretching pressurized fluid, a large number of mesh compartments formed by the cylindrical net on the insulating membrane, each consisted of the net yarns at four sides, bounded by the tubular film at one side of the mesh and by the umbrellalike insulating membrane at the other side of the mesh, and arranged in series adjacently one by one, minimizes the leakage of the steam as disclosed hereinunder. The vapor leaking through between the net yarns and the insulating membrane or the tubular film is adiabatically expanded into the mesh compartments, and thus the pressure is lowered successively. Therefore, when vapor leaks through the maximum diameter section of the bag mandrel where said mesh compartments exist in series in many stages, the pressure is rapidly lowered, and a pressure sealing of high stretched pressurized vapor becomes possible by a labyrinthlike effect, whereby the vapor leakage can be minimized. These are the advantages of the present invention. Particularly, when the stretching pressurized vapor is allowed to be accompanied with a heating liquid, the liquid can reduce a sliding friction between the net yarns and the tubular film. The fact that the leaking fluid is a liquid, makes the pressure maintenance in the stretching section easier, because the viscosity of the fluid is far higher and its leaking resistance is accordingly larger than that of the gas. Further, the liquid can reduce the sliding resistance between the net and the film.

On the other hand, when the cooling liquid is discharged from the lower side of the insulating membrane, the meshes give a uniform discharge resistance to the entire periphery and make the discharge amount of the cooling liquid from every part of the periphery uniform. These are the effects attained in the present invention. When the discharge resistance is excessive, the supply pressure of the cooling liquid becomes higher and the umbrellalike insulating membrane is pushed upwards. These are the drawbacks, and thus in such cases, it is necessary to contrive to place a net upon another in a double or triple manner, to provide the net yarns with thick portions and thin portions to make the cooling liquid readily pass through the overlappings of meshes and clearances among the net yarns even if the net is pressed by the expanded tubular film from the outside and by the inside pressure of the bag from the inside.

FIG. $3a$ is an enlarged view of twisted yarns constituting a net. Usually, the twisted yarn has helical projections and corrugations like those of a rope, as shown in the drawing. Even if the film is pressed to the net yarns, the fluid leaks through the clearances among the projections and corrugations of the net yarns. Therefore, when less leakage of the heating pressurized fluid is desirable in the present invention, as in the case of the cylindrical net covering the umbrellalike insulating membrane, contacting surfaces of the net with the film are rubbed with a sandpaper, etc., to cut the fibers at the projected portions of the net yarns and fluff the yarns. The fluffs are caught at concave portions of the twist yarns, and the concave portions are filled with the fluffs. The frictional surfaces of the net yarns have less corrugations, never damage the film surface and considerably reduce the leakage of the fluid through the interfaces with the film.

If loosely twisted filament yarns are passed through between the meshes of the net yarns and wound around them, though not shown in the drawing, the wound fibers at the convex portions of the twisted yarns are pressed to move into the concave portions when the tubular film is passed over the net while sliding, and the net yarns become so flat that the leakage of the fluid can be minimized.

When it is desirable to discharge cooling water with less resistance, as at the discharge portion of the cooling water at the lower side of the umbrellalike insulating membrane, regular corrugations are given to the net yarns intentionally by mean of a foreign matter, or it is effective to make the discharge of the cooling liquid easy, even if the film comes in contact with the net, by winding in advance another yarn roughly through the part between twists to enlarge the corrugations of the net surface.

The upper and lower ends of the cylindrical net are fixed to the center shaft pipe as aforementioned so that the meshes can be uniformly expanded vertically and horizontally to cover the entire periphery at the respective horizontal diameter of the bag mandrel where the net covers. When a positive tension is applied to the net, thus fixed vertically downwards, the expansion in the diameter of the bag mandrel can be assured symmetrically to the shaft of the center pipe, and the meshes around the outer periphery of the bag mandrel can be always uniformly expanded around the entire periphery at the horizontal diameter. Passage of the heating pressurized fluid or the cooling liquid around the outer periphery of the bag mandrel can be uniformly effected. In case of free suspension, where no tension is positively applied to the cylindrical net vertically downwards, the meshes are not uniformly expanded at the outer periphery of the bag mandrel, and the expansion is liable to be deviated. These are the disadvantages. That is, the lower end of the cylindrical net is suspended by gravity strongly and vertically downwards by fixing thereto sufficient amount of lead plummets uniformly on its peripheral end, though not shown in the drawing, or a downward tension is always applied to the cylindrical net by providing the center shaft pipe a collar device, which is provided with a coil spring and is capable of being pressed downwards, and fixing the lower end of the cylindrical net to said collar device, as shown in FIG. 4 as one embodiment thereof. These are the features of the present invention.

FIG. 4 is a cross-sectional view illustrating an apparatus for biaxial stretching, provided with the cylindrical net. FIG. 4 illustrates a case, as one of the embodiment of the present invention, where a multiplex central pipe consists of concentrically installed passage ways, but it is possible to use an assembly of each individual passageways in a bundle or other suitable manner in place of the central pipe illustrated above. A tubular film 1, which has been primarily molded, is passed through between pinch rollers 2 and 2', which determine the feeding speed of the film, and is transferred vertically downwards. The folded and flat film is made to expand again by a portion of pneumatic pressure or stretching pressurized vapor from a pressure gas pipe 4, at the level 3 and is returned to the tubular film shape at the primary molding. Then, a heating pressurized fluid for stretching, for example, steam water or a concentrated ammonium nitrate solution etc., heated to a high temperature of 100° C. or more is supplied into the tubular film through a center pipe 5, and then through small perforations at the outer periphery of a fluid-distributing chamber 6 at the upper end of the center pipe apparatus. In case where the heating pressurized fluid is a liquid, the liquid must be supplied through a resistance layer for example a cloth-wrapped resistance layer 8 surrounding the outer periphery of the fluid distributing chamber. When a high-temperature liquid is supplied into the pipe 5 at a predetermined rate, which is to be supplied through the small perforations 7 or the resistance layer 8 it is necessary that the liquid is kept under a pressure, which can prevent the liquid from boiling within the pipe 5. When boiling takes place within the pipe 5, the supply of the heating liquid is apt to become abruptly fluctuating because of boiling. This is a disadvantage. In case where the heating pressurized fluid is a liquid, and the above-mentioned device is used a pressure drop down to the stretching pressure takes place while the liquid passes through the resistance layer 8, and as it has passed therethrough, boiling takes place calmly. The tubular film is heated to a stretching temperature by the steam generated there and the heating liquid.

When the heating pressurized fluid is a liquid as in the above-mentioned case, another passageway which has an opening just above the fixed level of the umbrellalike membrane, although not shown in FIG. 4, should be provided in the multiplex central shaft pipe just at the outside of the passageway for introducing the heating pressurized liquid in order to take out a suitable amount of the said heating liquid, and return it to the feeding reservoir thereof, lest the cooling fluid should be excessively warmed up by the leaked heating liquid at the discharging level of the cooling liquid on the periphery of the bag mandrel where both the liquids meet together.

In case of a tubular film, whose suitable stretching temperature is about 100° C., for example, quench-shaped films such as those of nylon, polyester, polypropylene, etc., or the films of vinyl chloride and vinylidene chloride series, the heating pressurized fluid may be saturated pressure steam or pressurized heating water of 100° C. or a little more, but in case of high-density polyethylene, whose suitable stretching temperature is 110° to 120° C., or in case of Polypropylene film having a large parts of crystalline region or general purpose polystyrene, whose suitable stretching temperature is about 125° C., a concentrated (60–70 percent) ammonium nitrate solution is heated to 130°–150° C. under a pressure, and a predetermined quantity thereof is supplied by means of a pump. After passing through the resistance layer 8, the highly heated pressure solution undergoes rapid pressure drop down to a pressure corresponding to the stretching pressure within the tubular film, where the boiling takes place and vapors are thereby generated. At the same time, the salt solution is concentrated and takes further higher boiling point. That is to say, the tubular film is heated with the generated vapor and a highly concentrated solution of a high boiling point, and the tubular film begins to expand and stretching is effected by the generated vapor pressure.

When the tubular film is heated with a liquid, a cylindrical net 9 is suspended at the outer periphery of the resistance layer of the distributing chamber 6, which is preferably a sintered metal 8, that is, which may be a metal layer having many small perforations, so that the net may come in contact with the inside surface of the tubular film. Through such arrangement, the channeling of the liquid passing downwards along the film can be prevented and the portion of the tubular film in contact with the heating liquid and vapor can be uniformly heated at same level.

The heated tubular film starts to be stretched at a stretch-starting level 10 by the vapor pressure. In case where the primarily shaped tubular film is completely equal in thickness and homogenous, and where the inside pressure is completely constant, the tubular film is expanded and stretched only by the inside pressure of the vapor, but, as the actual tubular film is slightly nonuniform in thickness in a longitudinal direction or peripheral direction or is not uniform in its fine structure and as there are cases small fluctuations are brought about in the inside pressure, it is preferable that most of stresses necessary for the expansion and stretching can be given by the inside pressure in the expansion and stretching of the tubular film in the actual stretching operation, and the remaining small portion of the stresses is given by utilizing the wedging in force of the bag mandrel resulting from a tension on the film effected from taking-up means, and thus the stretching is carried out thereby. As the film has a strength to some extent and withstands the expanding force, the stationary operation can be assured without interruption at that time.

Accordingly, the level 10 is changed according to a change in the level of the bag mandrel. When the expansion and stretching are carried out only by the vapor pressure, a rapid and excessive expansion is carried out at the thinner portion of the tubular film leading to much vapor leaking from the outer periphery of the bag mandrel at the film portion excessively expanded during traveling thereof. Thus, the stretching pressure is suddenly lowered, as a result, the tubular film fails to undergo expansion, and the unexpanded narrow tubular film strongly rubs the outer periphery of the bag mandrel. That is, rupture of the film takes place, otherwise, a pressure rise occurs due to the decreased vapor leakage resulting from pressure exerted on the bag mandrel by unexpanded tubular film and accordingly the tubular film begins to expand again up to an extent where pressure sealing action breaks and these phenomena are seen repeatedly, that is, in other words, a breathing phenomenon appears in the expanding and stretching operation.

If the vapor pressure is too low, most of the stresses for the expansion and stretching depends upon the wedging-in force of the bag mandrel. In such a case, when a high-speed operation is carried out, a sliding frictional resistance between the tubular film and the bag mandrel becomes considerably high, and rupture of the film takes place. Therefore, most of the stresses for the expansion and stretching must be exerted by the inside pressure of the vapor, and the wedging-in force of the bag mandrel must be as small as possible. These are the necessary conditions for the high-speed operation. Therefore, it is an especially preferable procedure for carrying out a high-speed operation with less troubles to mix a liquid even into the heating pressurized fluid at the thin layer clearances between the film and the outer periphery of the umbrellalike insulating membrane above the bag mandrel and utilize the resulting reduction in the frictional resistance owing to the lubricating effect of the liquid.

In this manner, the tubular film, which has been expanded and stretched, comes in contact with the cooling liquid discharged from the lower end of the umbrellalike insulating membrane 11 at the maximum diameter level of the bag mandrel, and is cooled and fixed. At that time, the cylindrical net is sandwiched between the tubular film on the outer side of the net and the insulating membrane on the inner side at the maximum diameter level of the bag mandrel as the upper end of the cylindrical net 13 is fixed to the center pipe so that the net can cover the insulating membrane and in order to provide the cylindrical net 13 with a vertically downward tension, the lower end of the net is fixed to a collar device 18, which is provided around the center pipe and moves upwards or downwards, and is pressed downwards by a coil spring 17 installed between the collar device and an airtight block 16, to which the lower end of the bag mandrel is fixed. At that time, meshes constitute small mesh compartments, each being formed by yarns of the net at four sides thereof and on the other two facing surfaces by a tubular film and an insulating membrane and thereby said meshes act as a pressure sealing means.

Accordingly, when the heating pressurized vapor is used for the stretching, the vapor leaked from small clearances between the net yarns and the walls on both the sides is adiabatically expanded into the mesh compartments one after another, and therefore the pressure is rapidly decreased. In the neighborhood of the maximum diameter level of the bag mandrel, these small mesh compartments are arranged almost in series in the leaking direction and are in a structure capable of covering the entire periphery. Therefore, in this case, even if the leaking distance is short, the pressure drop of the vapor is remarkable and the pressure sealing can be readily effected owing to the principle of labyrinth effect. That is to say, the covering of the outer surface of the umbrellalike insulating membrane with a net ensures easy maintenance of the high stretching vapor pressure. A drain, formed from the saturated vapor after heating the tubular film, therefore, serves as a lubricating agent, because it makes wet the net. However, hot water may be supplied to the apparatus so as to mix with the saturated vapor. That is to say, when a suitable amount of heated water of a sufficiently high temperature and high pressure is supplied thereto, the hot water boils and generates steam without any supply of further steam, until the pressure corresponds to the stretching pressure, and the remaining portion is leaked over the meshes as hot water and leaves the net or taken out by means aforementioned. When a heated pressure solution of the concentrated 60–70 percent ammonium nitrate solution at 130°–150° C. is used as the stretching pressure fluid, the ammonium nitrate solution supplied into the tubular film undergoes rapid boiling in the stretching operation of the tubular film, as is the usual case where a stretching pressure of 0.1 atmosphere or less is used, and the liquid temperature is lowered, but the ammonium nitrate solution is concentrated, whereby a highly concentrated, high boiling point solution is formed. That is, it becomes possible to heat the film to such a temperature as high as 115°–127° C., and the generated vapor helps to heat the tubular film up to about 100° C. and at the same time serves as a stretching pressurized gas. Then, the vapor is absorbed into the cooled ammonium nitrate solution, and then the solution concentration can recover its original concentration suitable for its reuse.

A cooling liquid supplied to the downside of the umbrellalike insulating membrane from the upper end 20 of a pipe 19 thermally insulated from the pipe 5, through which the heating fluid passes, passes over the outer periphery of the bag mandrel 12, that is, in the drawing, through the clearance of the double cylindrical net 14. The cylindrical net 14 covers the outer periphery of the bag mandrel 12 and its lower end is fixed to the collar device 18 to apply a vertical downward tension to the cylindrical net. At the start of the operation, the maximum diameter of the bag mandrel is small, but the horizontal diameter of the bag mandrel is gradually expanded by a pressurized gas supplied from the upper end 22 of a pipe 21. When the bag mandrel reaches the desired diameter, the inside pressure of the bag mandrel is kept constant.

The bag mandrel is provided usually by stretching an elastomer, that is, a rubber bag, vertically 1.5 to 2 times as long and fixing it to the central pipe. By so doing, symmetrical expansion can be attained along the center pipe when the bag mandrel is expanded by the inside pressure. Such is very convenient, because the bag mandrel will not be deviated to the right side or the left side during the operation. A suitable form, that is, an oval form, spherical form, etc., of the expanded bag mandrel can be selected.

The cooling water uniformly passes through the clearances of the cylindrical net at the lower end opening part of the umbrellalike insulating membrane 11 along the entire periphery, and the cooling water is supplied in an amount enough to absorb and cool the heating, stretching pressurized fluid, which leaks on the umbrellalike insulating membrane, and at the same time cool and fix the expanded tubular film. In that case, the tubular film at the maximum diameter level of the bag mandrel is cooled, if necessary, with a cooling fluid from the outside.

When an ammonium nitrate solution heated to a high temperature is used as the stretching heating pressurized fluid, a cold ammonium nitrate solution is used as a cooling liquid. When the film is expanded and stretched only with the pressurized steam, the cooling can be effected only with cold water.

It is convenient that, when another cylindrical net 15 is suspended at the maximum diameter level of the cylindrical net 13 over the umbrellalike insulating membrane, the cooling liquid, which has passed downwards, can be prevented from the channeling on the inside surface of the expanded tubular film. The cooled stretched film is longitudinally cut by a cutter 23, spread to a flat sheet and taken up at the lower side. A stationary blade edge, rotary edge or thin revolving grinder, etc., is used as a cutter. The central shaft pipe is supported, though not shown in the drawings, at the position below the stretched film-cutting section from outside, and the fluids are introduced into the central multiplex shaft pipe. The expanded, stretched film 24 is passed through the nip of the pinch rollers 25 at a surface speed, which determines the stretching ratio in a longitudinal direction, and taken up towards the successive step.

In many cases, the cylindrical net used in the present invention has the same number of meshes on the same level diameter from the upper end to the lower end before it is placed in the apparatus, but after it has been placed in the apparatus and while it is used in operation, the upper and lower ends of the net are gathered, as shown in FIG. 4, and the intermediate section takes an expanded shape like that similar to an ellipsoid. Such intermediate section performs the principal role, and therefore the meshes of the cylindrical net may not be equal along the entire length, and a net having a shape similar to a cylinder or a sphere, whose number of meshes is decreased toward both the ends of the net, and which has an expanded intermediate section and narrow upper and lower ends, can be used. Further, as the feature of the use of the net is fulfilled only by the cylindrical net section in the neighborhood of the maximum diameter level of the bag mandrel, the other sections may be connected to a net having different mesh sizes or cloth. Usually, when the mesh sizes are usually larger, net yarns of larger sizes are used. When the mesh sizes are smaller, net yarns of small sizes are usually used. In many cases, the net used between the thin layer clearances through which the heating pressurized fluid leaks, has smaller mesh sizes than those of the net used at the discharge section of the cooling water. Usually, the net having a mesh size whose side length is about 5 to about 15 mm., is used.

In case of the net of oblique intersections of the net yarns, particularly in the case of large knot sections such as in the case of knotted fishing net, it is desirable that multifilaments are wound along the twist of the yarn section between one knot and another to make the entire net flat. In this respect, knotless fishing nets are preferable, because the knot section has almost equal thickness to that of other section.

The net referred to in the present invention is not only the net like the fishing net, but includes also a knit product having some space between one yarn and another. That is, a net, fabric, knit cloth, etc., can be used so long as the constituent yarns hold some regular distances.

What is claimed is:

1. An apparatus for biaxially stretching a thermoplastic tubular film which comprises a pair of pinch rollers at the feeding side of the apparatus; a multiplex central shaft pipe which supports a fluid distributor, an umbrellalike insulating membrane, a bag mandrel and a gastight block; a cutter and a pair of pinch rollers at the taking-up side; the multiplex central shaft pipe being provided with at least four passageways, the first of which passageways has an outlet opening below the first pinch rollers but above the fluid distributor and is used for introducing a pressurized gas, the second of which passageways is connected to the fluid distributor and used for introducing a heating pressurized fluid, the third of which passageways has an opening below the umbrellalike insulating membrane but above the bag mandrel and is used for introducing cooling liquid and thermally insulated from the passageways for heating pressurized fluid and the fourth of which passageways has an opening within the bag mandrel and is used for introducing a pressurized gas to inflate the mandrel; the fluid distributor having a perforated sidewall of a sufficient vertical length to determine the starting level of stretching; the umbrellalike insulating membrane being fixed at an appropriate level on the other sidewall of the multiplex central shaft pipe above the opening of the third passageway and having a sufficient length to cover the upper surface of the bag mandrel down to the level of the maximum diameter thereof; the bag mandrel being flexible, whose upper end is fixed to the outer wall of the multiplex central shaft pipe at the level just below the opening of the third passageway and whose lower end is fixed to the gastight block fixed gastightly to the outside wall of the multiplex central shaft pipe; the cutter being located at a level sufficiently below the gastight block; a tubular film being caused to pass through between the nip of the first pinch rollers and travel vertically downwards along the side surface of the fluid distributor, successively along the umbrellalike insulating membrane, while being inflated and stretched, and is cut longitudinally by the cutter and taken up by the nip of the second pinch rollers; said apparatus is further characterized by a plurality of cylindrical nets and means which give sufficient tension to said nets; the outermost net being of fine mesh, placed upon the umbrellalike insulating membrane and fixed at the upper end thereof to the outer wall of the passageway to which the umbrellalike insulating membrane is fixed; and the remaining cylindrical nets being of coarser meshes than the outermost one, placed upon the bag mandrel and fixed at the upper end thereof to the outer wall of the passageway to which the upper end of the bag mandrel is fixed; the lower ends of all these nets being fixed to the means which gives positive tension to the nets; the said means being located around the wall of the multiplex central shaft pipe at a position sufficiently below the gastight block, capable of moving vertically along the pipe and exerting uniform and sufficient tension on the said nets.

2. An apparatus of claim 1 wherein all of the passageways are arranged in concentric relationship and all but the central one forms annular passageways.

3. An apparatus according to claim 1, wherein one of the passageways forms a circular outside pipe in which all of other passageways are accommodated in bundle state.

4. An apparatus according to claim 1, wherein the multiplex central pipe shaft is a circular outside pipe, inside space of which is divided into at least four passageways.

* * * * *